Aug. 11, 1959　　　S. SALEM ET AL　　　2,898,665
CORD FABRIC WITH REMOVABLE WEFT THREAD
Filed May 13, 1955

INVENTORS
Samuel Salem
Robert E. Bingham
Donald Anderson
BY McCoy, Greene + deGoleyhuis
ATTORNEYS

2,898,665
CORD FABRIC WITH REMOVABLE WEFT THREAD

Samuel Salem, Robert E. Bingham, and Donald Anderson, Akron, Ohio, assignors to The General Tire and Rubber Company, Akron, Ohio, a corporation of Ohio Application May 13, 1955, Serial No. 508,032

1 Claim. (Cl. 28—78)

The present invention relates to a cord fabric containing disintegrable weft threads which may be removed from the warp cords and to a method for reducing weft cord fabric to weftless fabric for use in making pneumatic tires or other reinforced rubber articles.

The use of weak-weft tire cord fabric is widespread since it does not require the extensive mechanical installations normally required for conventional weftless operation, but tires made from weftless fabric are found to be superior to those made from weak-weft fabric particularly where the warp cords of the fabric are subjected to a hot-stretching process before being applied to a tire carcass, for example as disclosed in the copending application of Salem et al., Serial No. 442,364, filed July 9, 1954.

Since the warp cords often must be stretched 10 to 20 percent by tensioning rollers to obtain best results, it is necessary to apply high nip pressures at said rollers particularly where the cords are stretched while wet. The weft threads limit the nip pressure that may be safely applied to the fabric since the warp cords may be greatly weakened or partially severed where the weft threads intersect the warp cords and are pressed against said cords.

Another disadvantage of weak-weft threads, as indicated in said copending application, is that said threads tend to cause uneven spacing of the warp cords when said cords are stretched substantially and make it difficult to heat the warp cords uniformly during the hot-stretching process. The weft threads cause gathering or bunching up of the warp cords near the side edges of the fabric web which would not occur with weftless fabric.

A large proportion of flex breaks in tires are found to occur at points where the weft threads cross the warp cords, indicating that the friction developed by the rubbing of the weft threads across the warp cords during use of the tire substantially weakens the warp cords and hastens their failure. Higher quality rubber tires may be made by removing or disintegrating the weft threads before completion of the tire, for example by burning, decomposing or melting the threads during vulcanization or during hot-stretching of the warp cords or by dissolving said threads in a solvent which does not damage the warp cords.

According to the present invention the parallel warp cords are interwoven with disintegrable weft threads having sufficient tensile strength to hold said cords in parallel relation so as to form a fabric web of uniform width which may be wound on supply rolls and stored like ordinary weak-weft fabric. The ends of such rolls may be spliced in the conventional manner for continuous processing of the fabric. The present invention is particularly advantageous for tire manufacturing plants equipped for weak-weft operation since it permits the manufacture of weftless fabric tires with a minimum amount of additional equipment.

One method of disintegrating the woof or weft threads according to the present invention is to apply a heated fluid to the fabric which does not injure the warp cords so as to melt or dissolve the weft threads. Where the weft threads are selected so that their melting point or decomposition temperature is substantially less than the melting point of the warp cords, the fabric may be heated to a temperature sufficient to melt or decompose the weft threads but insufficient to melt or damage the warp cords.

The preferred method of the present invention for disintegrating the weft threads without damaging the warp cords is to dissolve said threads in the solvent in which the warp cords are insoluble before the warp cords are heated and stretched in the oven. By properly selecting the solvent and the weft thread material, it is possible to obtain a weft thread having sufficient strength to hold the warp cords in parallel relation and to dissolve or disintegrate the weft thread without damaging the warp cords. A weft thread of polyvinyl alcohol, for example, has greater strength than average cotton thread of the same size and is readily soluble in an aqueous solution at a moderate temperature. Through the simple expedient of dipping spraying, flushing, or otherwise applying water to the cord fabric, the weft thread is dissolved leaving weftless cord fabric which may thereafter be treated with a rubber-to-fabric adhesive, hot-stretched, and used in pneumatic tires like conventional weftless fabric. Where the weft threads have a melting point substantially less than that of the warp cords, any portion of said threads which is not completely dissolved may be melted by heating during the hot-stretching of the warp cords. Where polyvinyl alcohol weft threads are employed, the disintegration by the aqueous solvent is very rapid and is usually complete so that melting of the threads is unnecessary.

An object of the present invention is to provide a simple and inexpensive method of making high quality weftless fabric for pneumatic rubber tires and other reinforced rubber articles.

A further object of the invention is to provide an improved cord fabric having disintegrable weft threads which may easily be removed prior to or during treatment of the fabric to obtain the advantages of weftless fabric.

Other objects of the invention are to eliminate severing or weakening of the warp cords by the weft threads due to the application of high nip pressures during stretching of the warp cords and to eliminate bunching and uneven spacing of the warp cords during stretching thereof.

Various other objects, uses and advantages of the present invention will become apparent to those skilled in the art from the following description and claims and from the drawings, in which:

Figure 1:
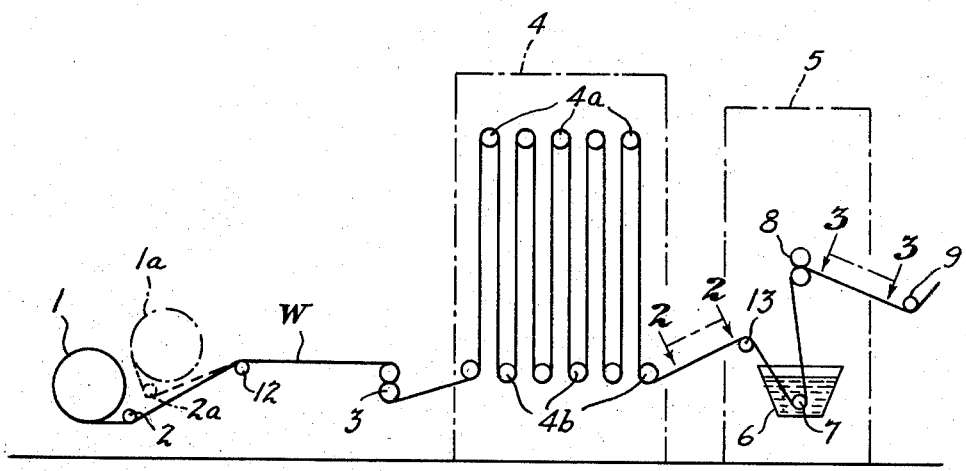
Figure 1 is a schematic side elevational view on a reduced scale showing an apparatus which might be used to perform the method of the present invention, an additional supply roll being shown in dot-dash lines.

According to the present invention a woven tire cord fabric is provided having strong warp cords and disintegrable weft threads attached to the cords for holding them is spaced parallel relation. The warp cords may be made of various flexible materials such as cotton, nylon, viscose rayon, Dacron, or the like having high tensile strength. Dacron is an oriented fiber of the polyester formed from ethylene glycol and terephthalic acid (polyethylene terephthalate fiber oriented along the fiber axis). Nylon has a very broad meaning and covers very many types of fibers, usually being considered to be an oriented fiber of long-chain polymeric amides, such as hexamethylene diamine and adipic acid (polyhexamethylene adipamide or Type 66 nylon), but also may be considered as an oriented fiber of polycapryl lactam which is commonly called Perlon or Type 6 nylon. Both hexamethylene adipamide and polycapryl lactam may be included under the term "nylon" as employed herein.

The disintegrable weft threads must have sufficient strength to hold the warp cords in spaced parallel relation and should be capable of being woven in the conventional manner to form a weak-weft fabric or otherwise attached to the warp cords. The weft thread usually should have a tensile strength at 150° F. greater than about ¼ gram per denier and preferably at least about ½ gram per denier. Superior results may be obtained where the disintegrable weft thread has a tensile strength at 150° F. of about one or more grams per denier. Such thread is excellent if it has a tensile strength greater than that of an ordinary cotton tire thread of the same size.

In weaving the tire cord fabric of the present invention it is usually preferable to employ weft threads each with a tensile strength at normal temperatures of at least about 100 grams or so to minimize the number of threads needed to hold the warp cords, and better results are usually obtained where each weft thread has a tensile strength of about 200 or more grams at normal temperatures. The ultimate tensile strength of each weft thread is preferably less than about one-tenth that of each warp cord. Where each weft thread has a tensile strength in the neighborhood of one-half pound, each warp cord may have a tensile strength more than fifteen or twenty pounds.

The weft threads should be capable of holding thousands of warp cords in parallel relationship after being interwoven with said cords. The warp cords used for building a pneumatic tire should be closely spaced (preferably at least about twenty warp cords per inch), but the transverse weft threads are preferably spaced a greater distance apart (usually a distance greater than about one-fourth of an inch) to minimize the amount of weaving required and the cost of the woven fabric.

While the weft thread used in the tire cord fabric of the present invention must have sufficient strength, it must also be of a type which may readily be disintegrated without damaging the warp cords or rendering them less suitable for reinforcing a rubber tire or the like. One method of disintegrating the weft threads according to the present invention is to apply a heated fluid to the fabric which does not injure the warp cords so as to melt or dissolve the weft threads. Such fluid may be hot water or other heated liquid or may be hot air or hot combustion gases which are not harmful to the warp cords. Where the melting point of the weft threads is substantially less than that of the warp cords, said threads may be disintegrated by melting to provide a weftless fabric. The melting point of the weft threads is preferably at least fifty degrees Fahrenheit less than that of the warp cords and sufficiently less than the melting point of said cords to avoid damage to the cords which would render them substantially less suitable for reinforcing a tire carcass. Where the warp cords are subjected to a hot-stretching process, such for example as described in said copending application Serial No. 442,364, the weft threads may be melted during drying or hot stretching of the fabric, the heat needed for treatment of the warp cords being used in an efficient manner to melt the weft threads. While the warp cords are being heated with combustion gases and stretched and before the warp cords are cooled, the weft threads may be melted and disintegrated. After cooling the tension on the resulting weftless cord fabric may be removed and said fabric may be calendered and used to build a pneumatic tire like conventional weftless fabric.

Disintegration of the weft threads by application of heat is a practical method of producing weftless fabric where the warp cords can withstand very high temperatures without damage (for example temperatures in the neighborhood of 400° F. or above). High melting point warp cords made of Type 66 nylon (polyhexamethylene adipamide), Dacron, or the like are excellent for this method. As pointed out in said copending application Serial No. 442,364, Dacron cords may be treated to advantage by heating them while under tension for a period of about 20 seconds to one minute with hot gases maintained at a temperature between about 400° and 450° F., and superior Dacron cords may be obtained by heating the cords for about one minute with hot gases maintained at a temperature of about 400° F. Where the cords may be heated to high temperature for such long periods of time, it is practicable to melt the weft threads so as to free the cords. Although polyhexamethylene adipamide cords are preferably heated no more than about twenty or twenty-five seconds with gases at a temperature between about 400° and 425° F., satisfactory weft threads may be selected which melt in the period of time required for heating of said cords.

The weftless threads employed in the method of the present invention may be polyvinyl alcohol and various other materials having melting points substantially less than that of the warp cords, but materials having very low melting points such as carnauba wax, polyethylene, vinyl chloride, vinyl acetate and the like are usually undesirable because of their low tensile strength and their inability to hold their shape when subjected to medium temperatures which may be encountered during weaving or at other times. Where the weft threads are to be disintegrated by melting, said threads are preferably made of cellulose acetate or acetate rayon (estron) having a melting point in the neighborhood of about 400° F.

A woven tire cord fabric of the present invention containing about two thousand closely spaced parallel warp cords of polyhexamethylene adipamide (melting point in the neighborhood of about 480° F.) held in parallel relationship by weft threads of cellulose acetate yarn may be dipped in a latex adhesive or other fabric-to-rubber adhesive, heated with hot combustion gases maintained at a predetermined temperature between about 400° and 450° F., stretched during the application of heat by the application of a predetermined tension, and cooled before the tension is released, for example by the methods disclosed in said copending application Serial No. 442,-364, so as to obtain nylon cords of the highest quality. When treating the nylon warp cords in such manner the fabric may be subjected to the hot combustion gases anywhere from about ten to twenty seconds and for a sufficient time to melt and disintegrate completely the cellulose acetate weft threads so that the fabric is weftless before the cords are cooled and the tension thereon is released.

The preferred method of disintegrating the weft threads is to dissolve them in a solvent in which the warp cords are insoluble. Where the warp cords are nylon, Dacron, viscose rayon or similar fibers, the solvent for the weft theads, may, for example, be benzene, acetone or various other aromatic solvents which do not damage the warp cords or an aqueous liquid which is not harmful to said cords. Various solvents may be employed and various weft thread materials may be used in performing the method of the present invention. The weft threads may, for example, be soluble in the rubber-to-fabric adhesive dipping solution so that the weft threads dissolve as the warp cords are being coated with adhesive. Where the weft threads are soluble in an anhydrous solvent such as benzene which is suitable for a solvent dip containing isocyanates, such solvent dip may be used to dissolve the weft threads as the warp cords are treated with the isocyanates. Such a solvent dip is described in the copending application of Samuel Salem, Serial No. 414,161, filed March 4, 1954, and entitled "Adhesion of Synthetic Polymers to Polymerizable Materials," now U.S. Patent No. 2,766,164.

The weft threads may be made of cellulose acetate or acetate rayon (estron) in which case they can be dissolved in a solvent such as acetone, ethyl acetate, or a ketone which does not damage the warp cords of nylon, viscose rayon or Dacron. However, it is usually preferable to select the weft threads so that they may be dissolved in a solvent which is non-toxic and easy to handle safely.

According to the present invention rolls of tire cord fabric are unwound and the weft threads are disintegrated to obtain a weftless fabric. In order to permit a continuous operation, the threads are disintegrated while the fabric is in motion. To permit such operation, the soluble weft thread should be capable of completely dissolving in the solvent in less than one minute under conditions which are not harmful to the warp cords. As a practical matter, it should be unnecessary to heat the solvent to a temperature above about 150° F. to dissolve the weft thread in that period of time. The weft threads preferably dissolve in the solvent at a temperature not in excess of about 150° F. in a period of time not in excess of about 20 seconds, and superior results are obtained when the threads dissolve in about one-half to ten seconds in a solvent such as water maintained at a temperautre not in excess of about 110° F. Where the temperature is about 150° F. dissolving of the weft threads usually requires more than one-fourth of a second, and no advantage is obtained by reducing the dissolving time to much less than one-half of a second. Since it is expensive to maintain the solvent at a high temperature, those solvents are preferred which operate effectievly at temperatures not substantially above atmospheric temperature.

It is preferable to employ an aqueous liquid as the solvent for the weft threads since such liquid is easiest to handle and cannot damage the warp cords. Various water-soluble materials might be used for the weft thread, such as polyacrylic acid or polyvinyl alcohol. Of these, polyvinyl alcohol filament yarn is far superior to any other material now known since it has a tensile strength several times that of cotton and may be dissolved rapidly with water at a moderate temperature. If desired the polyvinyl alcohol yarn may be treated prior to weaving with glycerine or other chemicals to accelerate dissolving of the threads in lower temperature water. By treating the polyvinyl alcohol filaments, it is possible to dissolve the weft threads in less than ten seconds in water maintained at a temperature of about 60 to 110° F.

Figure 2:
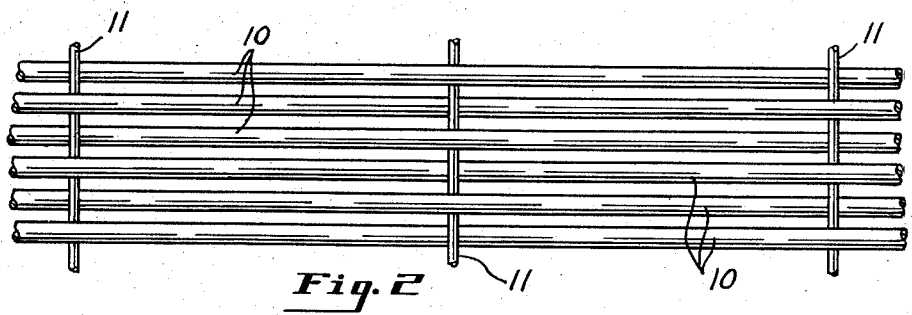
Figure 2 is a fragmentary top view of the fabric web taken on the line 2—2 of Fig. 1 and on a larger scale.
Figure 3:
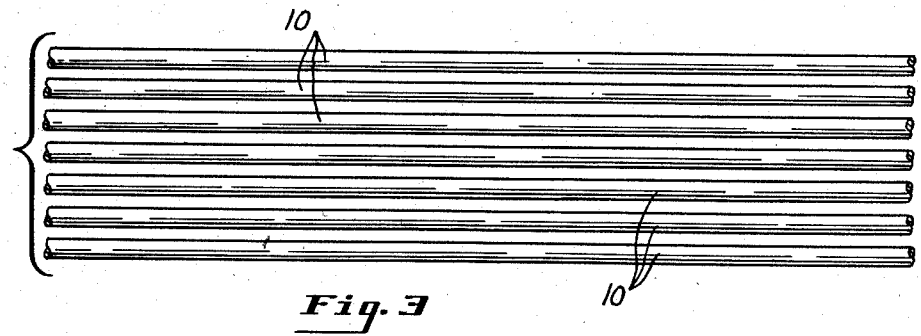
Figure 3 is a fragmentary top view of the fabric web taken on the line 3—3 of Fig. 1 and on the same scale as Fig. 2.

Figures 1 to 3 illustrate a practical apparatus which may be used to disintegrate the weft threads according to the method of the present invention. Such apparatus includes means for rotatably supporting one or more supply rolls and for unwinding a woven fabric web from said rolls while guiding them longitudinally over a plurality of horizontal guide rollers. As shown in Fig. 1, a long woven fabric web W of uniform width and substantially uniform thickness is unwound from a horizontal supply roll 1 having a horizontal cylindrical guide roller 2 for directing the web W horizontally from the bottom of said supply roll. A small tension is applied to the web W by a pair of horizontal cylindrical motor-driven pull rolls 3 to move the web longitudinally at constant speed to a conventional accumulator 4. The accumulator contains upper and lower rows of horizontal cylindrical rollers 4a and 4b mounted for movement vertically toward and away from each other to increase or decrease the length of the web W in the accumulator in accordance with the tension applied to the web leaving the accumulator.

After passing through the accumulator, the fabric web W enters a dipping apparatus 5 in which the weft threads of the fabric are dissolved. The dipping apparatus includes a dip tank or trough 6, a submerged horizontal guide roller 7 in the tank below the level of the liquid therein, and suitable means for removing excess dip liquids and solids from the fabric after it leaves the dip tank. Such means may take the form of high pressure air jets, scrapers, beater bars, or the like, but as herein shown such means is in the form of a pair of motor-driven horizontal squeeze rolls 8 directly above the dip tank 6. The squeeze rolls 8 engage the top and bottom faces of the weftless fabric leaving the dip tank and cause the web W to move at a predetermined constant speed from the accumulator 4. A horizontal cylindrical guide roller 9 is provided near the dipping apparatus 5 for directing the weftless fabric from the squeeze rolls. After leaving the roller 9 the weftless fabric may be dried and treated in a conventional manner before being used to build a tire or other reinforced rubber article. The fabric may, for example, be coated with latex adhesive, stretched under a predetermined tension while being subjected for a predetermined time to hot combustion gases at a predetermined temperature, cooled, calendered, and incorporated in rubber tires or the like as disclosed in said copending application Serial No. 442,364. Suitable means may be provided to maintain a tension on the weftless fabric leaving the squeeze rolls and to hold the warp cord of the weftless fabric in parallel relationship as they move away from the squeeze rolls.

The web W preferably has a uniform width of at least 50 or 60 inches and preferably contains about twenty to forty warp cords per inch. Said cords are held in parallel relation by transverse weft threads which are more widely spaced, the longitudinal distance between adjacent strands of the transverse threads being preferably at least about one-quarter inch. As herein shown, the woven fabric web W has a multiplicity of closely spaced longitudinal warp cords 10 of high tensile strength held in parallel relationship by more widely spaced disintegrable weft threads 11 having a tensile strength substantially less than that of said warp cords. The disintegrable weft threads preferably are substantially smaller than the warp cords to facilitate disintegration and may have a tensile strength per thread less than one-tenth the tensile strength of each warp cord.

The web W is pulled from the supply roll 1 over the guide roller 2 and over a horizontal cylindrical guide roller 12 to the pull rolls 3 and into the accumulator 4 and is pulled by the squeeze rolls 8 over the guide rollers 4a and 4b of the accumulator to the dipping apparatus 5, the web passing over a horizontal cylindrical guide roller 13 and under the submerged roller 7 before reaching the squeeze rolls.

In order to permit continuous processing of the woven fabric web W, the end of the web from each supply roll is spliced in the conventional manner to the end of the web of another supply roll, for example by vulcanizing strips of rubber to overlapping end portions of the fabric webs or strips. The splices may be made strong enough to withstand tensions of five or ten pounds per cord or more which may be encountered during hot-stretching of the warp cords in an oven. As shown herein, a second supply roll 1a, similar to the supply roll 1, and a horizontal cylindrical guide roller 2a are mounted near the supply roll 1. The end of the web W of the supply roll 1 may be spliced to a similar fabric web on the supply roll 1a when the web W is completely unwound from the roll.

The dip tank 6 is filled with a liquid solvent which dissolves the weft thread 11 without damaging the warp cords 10 so that a weftless fabric passes over the guide roller 9 from the squeeze rolls 8 as shown in Fig. 3.

The weft threads 11 may be made of cellulose acetate or acetate rayon while the warp cords 10 are made of cotton, nylon, Dacron, viscose rayon or other oriented synthetic linear polyamides and polyesters, in which case the tank 6 could be filled with ethyl acetate, acetone or other solvent for the weft threads. However, best results may be obtained where the weft threads are made of polyvinyl alcohol and the tank 6 is filled with water or an aqueous liquid containing materials other than water which will not harm the warp cords or render them less suitable for reinforcing pneumatic tires. Where the weft threads 11 are made of polyvinyl alcohol, the warp cords 10 may be cotton, viscose rayon, Dacron, nylon, or various other water-insoluble fibers suitable for reinforcing rubber articles. Such fibers are not dissolved and are not damaged substantially when subjected for more than twenty minutes to water at a temperature up to 150° F. Where the warp cords are to be treated with a latex adhesive in aqueous dispersion, the dip tank 6 may contain a vinyl pyridine latex such as "Gen-Tac" or other adhesive in aqueous dispersion, in which case the warp cords would be coated with adhesive during disintegration of the weft threads.

Tests show that polyvinyl alcohol filament yarn has a high tensile strength, is readily soluble in aqueous solutions, and when dissolved in water and applied to the warp cords has no substantial adverse effect on the adhesion of the warp cords to rubber. Tests also demonstrate that, at lower water temperatures, the time for dissolving the polyvinyl alcohol filament yarn may be reduced substantially by pre-treating the yarn with glycerine, although such treatment can reduce the tensile strength up to about one-third.

A 225 denier polyvinyl alcohol filament yarn was tested and was found to have an ultimate tensile strength or breaking strength of about 600 to 625 grams per filament, whereas ordinary 225-denier cotton yarn suitable for the weft threads of conventional weak-weft tire cord fabric normally has an ultimate tensile strength of only about 200 to 225 grams per filament. The 225-denier polyvinyl alcohol yarn was then treated by dipping in a ten percent solution of glycerine and drying the yarn. After drying the glycerine-treated polyvinyl alcohol threads were found to have an ultimate tensile strength or breaking strength of about 375 to 400 grams per filament, almost twice that of cotton. Both the treated and untreated polyvinyl alcohol threads had tensile strengths substantially higher than the minimum required for the weft threads of a weak-weft tire cord fabric.

The untreated 225-denier polyvinyl alcohol threads and the threads treated with glycerine as indicated above were then tested to determine how fast the treated and untreated threads dissolved in water. It was observed how long it required to dissolve each thread in pure water maintained at one of a plurality of predetermined temperatures from 70° F. to 140° F. and the results were recorded as indicated below.

| Water temperature | Time required to dissolve untreated 225-denier polyvinyl alcohol threads, seconds | Time required to dissolve 225-denier polyvinyl alcohol threads treated with glycerine, seconds |
|---|---|---|
| 70° F | 18 | 9 |
| 75° F | 12 | 5 |
| 80° F | 6 | 3 |
| 85° F | 4 | 2 |
| 100° F | 2 | 2 |
| 120° F | 1 | 1 |
| 140° F | 1 | 1 |

Further tests indicated that the time required to dissolve the untreated polyvinyl alcohol threads in water is not reduced substantially by adding glycerine, dilute sulfuric acid, or dilute sodium hydroxide to said water.

The test results indicate that the treatment of the polyvinyl alcohol threads with glycerine substantially reduces the time required to dissolve the threads in water if the water temperature is below about 100° F. and is particularly advantageous if the water temperature is maintained at or about atmospheric temperature. However, if the water is heated to a temperature of about 100° F. or above, the glycerine treatment is undesirable due to the reduction in the tensile strength of the cords.

It will be apparent that substantial amounts of polyvinyl alcohol will be dissolved in the aqueous solution in the dip tank 6 as the web W is passed therethrough and that some of the dissolved polyvinyl alcohol will penetrate into the warp cords 10. If the tank 6 is filled initially with pure water to dissolve the polyvinyl alcohol threads, such water will soon lose its purity. In order to limit the percentage of polyvinyl alcohol in the aqueous solution in the dip tank, the water may be replaced periodically or fresh water may be continuously supplied to the tank. By pumping fresh water through the dip tank or by replacing the solution regularly, the percentage of polyvinyl alcohol or other impurities in the water may be limited to a few percent or even less than one percent if desired.

In order to determine whether dissolved polyvinyl alcohol reduces the adhesion of conventional nylon tire cords (polyhexamethylene adipamide) to rubber, such cords were dipped in pure water, water containing as the only impurity five percent polyvinyl alcohol in solution, and water containing as the only impurity five percent polyvinyl alcohol and five percent glycerine in solution. The fiber cords tested were 840/2-denier polyhexamethylene adipamide cords of the type normally used in building pneumatic tires. After being dipped in one of the above-mentioned aqueous solutions and dried, each of the nylon cords was dipped in "Gen-Tac" (a latex adhesive containing 2-vinyl pyridine and styrene as described in said copending application Serial No. 442,364) and dried.

The nylon cords dipped in each of the solution and in the latex adhesive were then vulcanized to rubber to determine the adhesion of the nylon cords to the rubber. A conventional "H" adhesion test was performed to determine the adhesion to rubber of the cords dipped in each of the three different aqueous solutions. Such test involves laminated blocks containing a first layer of uncured rubber (a typical tire ply stock) and a second layer of square-woven fabric for reinforcing the rubber. The nylon cords to be tested are sandwiched between two spaced pairs of said blocks in engagement with the first unvulcanized layer of each block. The blocks of each pair are alined and vulcanized about 40 minutes at 287° F. to bond the nylon cords to the rubber. A tension is then applied to the cords by pulling the spaced pairs in opposite directions to determine the pull required to cause slippage between the cords and the rubber. It is found that the cords dipped in pure water and the cords dipped in the two aqueous solutions containing polyvinyl alcohol adhere to the rubber with a force between about 21 and 25 pounds and that neither the polyvinyl alcohol nor the glycerine has any substantial effect on the adhesion of the nylon to rubber.

It should be apparent from the above tests that polyvinyl alcohol filament yarn provides an excellent material for the weft threads of a tire cord fabric and that dissolving of polyvinyl alcohol in water will not damage nylon cords or render them less suitable for reinforcing rubber tires or the like. Since the melting point of polyvinyl alcohol threads is in the neighborhood of about 365° F. and since such threads have a tensile strength per denier at temperatures up to 200° F. substantially greater than that of cotton, threads of polyvinyl alcohol filament yarn are well suited for weaving and can easily hold the warp cords of a tire cord fabric in parallel relation. An excellent weak-weft tire cord fabric may, for example, be woven from 225-denier polyvinyl alcohol weft threads (untreated or treated with glycerine) and 840/2-denier polyhexamethylene adipamide warp cords, and such fabric may contain thirty or more warp cords per inch of width. Of course, it will be obvious that the denier and size of the warp cords and weft threads may vary substantially.

It will be understood that, in accordance with the provisions of the patent statutes, variations and modifications of the specific articles and methods described herein may be made without departing from the spirit of the invention.

Having described our invention, we claim:

A woven tire cord fabric for use in making weftless pneumatic rubber tires comprising a multiplicity of parallel longitudinal water-insoluble warp cords having a tensile strength of at least about ten pounds per cord, each cord being spaced laterally from the next adjacent cord a distance not in excess of about one-twentieth of an inch, and a multiplicity of parallel transverse water-soluble weft threads of polyvinyl alcohol interwoven with said warp cords to hold the same in parallel relation, each weft thread having a tensile strength not in excess of about one pound and being spaced longitudinally from the next adjacent thread a distance greater than about one-fourth of an inch, said weft threads being treated with sufficient glycerin so as to be soluble in water at a temperature of 70° F. in one-half to ten seconds, whereby the warp cords may readily be freed to form a weftless tire fabric by dissolving the weft threads in water.

References Cited in the file of this patent

UNITED STATES PATENTS

| | | |
|---|---|---|
| 1,444,070 | Hall | Feb. 6, 1923 |
| 1,665,230 | Spalding | Apr. 10, 1928 |
| 1,860,314 | Mendel | May 24, 1932 |
| 2,147,736 | Dreyfus | Feb. 21, 1939 |
| 2,277,259 | Schnabel et al. | Mar. 24, 1942 |
| 2,332,738 | Meade | Oct. 26, 1943 |
| 2,399,401 | Sonnichsen | Apr. 30, 1946 |
| 2,431,977 | Alderfer | Dec. 2, 1947 |

FOREIGN PATENTS

| | | |
|---|---|---|
| 682,182 | Great Britain | Nov. 5, 1952 |

OTHER REFERENCES

Ellis, Carleton: The Chemistry of Synthetic Resins, New York, Reinhold Pub. Corp., 1935, p. 1056. (Copy in Division 67.)